United States Patent
Lei

(10) Patent No.: US 11,030,431 B2
(45) Date of Patent: Jun. 8, 2021

(54) EFFICIENCY WHEN READING MULTIPLE BARCODES ON OBJECTS

(71) Applicant: The Code Corporation, Draper, UT (US)

(72) Inventor: Ming Lei, Princeton Junction, NJ (US)

(73) Assignee: The Code Corporation, Murray, UT (US)

(*) Notice: Subject to any disclaimer, the term of this patent is extended or adjusted under 35 U.S.C. 154(b) by 0 days.

(21) Appl. No.: 16/513,420

(22) Filed: Jul. 16, 2019

(65) Prior Publication Data

US 2020/0019743 A1   Jan. 16, 2020

Related U.S. Application Data

(60) Provisional application No. 62/698,636, filed on Jul. 16, 2018.

(51) Int. Cl.
*G06K 9/18* (2006.01)
*G06K 7/14* (2006.01)
*G06T 5/00* (2006.01)

(52) U.S. Cl.
CPC ......... *G06K 7/1443* (2013.01); *G06K 7/1452* (2013.01); *G06K 7/1486* (2013.01); *G06K 7/1491* (2013.01); *G06T 5/003* (2013.01); *G06T 2207/20201* (2013.01)

(58) Field of Classification Search
CPC ...... G06K 19/06; G06K 7/10851; G06K 7/14; G06K 17/0022; G06K 7/1491
USPC .......... 235/462.09, 436, 437, 462.15, 462.25
See application file for complete search history.

(56) References Cited

U.S. PATENT DOCUMENTS

| | | | | |
|---|---|---|---|---|
| 5,073,954 A * | 12/1991 | Van Tyne | ............. | G06K 7/1092 235/462.02 |
| 5,965,863 A * | 10/1999 | Parker | ................ | G06K 7/10851 235/462.15 |
| 6,491,223 B1 * | 12/2002 | Longacre, Jr. | ...... | G06K 7/10544 235/462.01 |
| 2012/0085823 A1 * | 4/2012 | Nakamura | ......... | G06K 7/10851 235/462.16 |
| 2018/0107915 A1 * | 4/2018 | Toedtli | .................... | G06K 19/14 |
| 2018/0276473 A1 * | 9/2018 | Kim | ....................... | G06F 3/0482 |

* cited by examiner

*Primary Examiner* — Daniel St Cyr
(74) *Attorney, Agent, or Firm* — Timothy P. O'Hagan; Ray Quinney & Nebeker

(57) ABSTRACT

This disclosure describes methods and systems for using a barcode reader to read multiple barcodes positioned on an object. The barcode reader attempts to locate a first priority barcode within an image using first priority information. The priority information may define a region of interest within the image. The barcode reader may search only the region of interest for the first priority barcode. The priority information may define one or more characteristics of the first priority barcode. Based on the results of attempting to locate the first priority barcode, the barcode reader determines whether to attempt to locate a second priority barcode within the image. The barcode reader may discard the image if the barcode reader fails to locate the first priority barcode or the results of attempting to locate the first priority barcode indicate that the image is unlikely to contain a decodable second priority barcode.

24 Claims, 8 Drawing Sheets

EFFICIENCY WHEN READING MULTIPLE BARCODES ON OBJECTS

CROSS-REFERENCE TO RELATED APPLICATION

This application is related to and claims the benefit of U.S. Provisional Patent Application No. 62/698,636, filed on Jul. 16, 2018. The aforementioned application is expressly incorporated herein by reference in its entirety.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

In accordance with one aspect of the present disclosure, a method is disclosed that may include attempting to locate a first priority barcode within an image and determining, based on results of attempting to locate the first priority barcode within the image, whether to attempt to locate a second priority barcode within the image.

The method may further include, in response to being unable to locate the first priority barcode within the image, discarding the image without attempting to locate the second priority barcode within the image.

The method may further include, in response to locating the first priority barcode within the image and decoding the first priority barcode, attempting to locate and decode the second priority barcode within the image.

Attempting to locate the first priority barcode within the image may include attempting to locate the first priority barcode within a first region of the image. Attempting to locate the second priority barcode within the image may include attempting to locate the second priority barcode within a second region of the image.

The method may further include determining a position of the first priority barcode within the image and determining whether to attempt to locate the second priority barcode within the image is additionally based on the position of the first priority barcode within the image and a known distance between the first priority barcode and the second priority barcode.

The first priority barcode may include a first polarity. The second priority barcode may include a second polarity.

Determining whether to attempt to locate the second priority barcode within the image may include determining whether the first priority barcode and the second priority barcode correspond to priority information associated with respective priority barcodes.

The method may further include, if the first priority barcode and the second priority barcode correspond to priority information associated with respective priority barcodes, decoding the first priority barcode and the second priority barcode and providing an output comprising decoded data. The method may further include, if the first priority barcode or the second priority barcode does not correspond to priority information associated with one or more of the respective priority barcodes, aborting any further decoding of the first priority barcode or the second priority barcode and discarding any previously decoded data from the first priority barcode or the second priority barcode.

The priority information may include one or more of barcode location information, symbology information, polarity information, and size information for one or both of the first priority barcode and the second priority barcode within the image.

The priority information may be stored on a storage device of a barcode reading device.

Determining whether to attempt to locate the second priority barcode within the image may include identifying that a threshold period of time has passed without locating the first priority barcode within the image and, in response to identifying that the threshold period of time has passed without locating the first priority barcode within the image, determining not to locate the second priority barcode.

In accordance with another aspect of the present disclosure, a barcode reading apparatus is disclosed that includes at least one processor and a non-transitory computer-readable medium. The non-transitory computer-readable medium stores instructions thereon that, when executed by the at least one processor, may cause the barcode reading apparatus to identify a first barcode and a second barcode within an image, determine that the one or more features of the first barcode within the image correspond to stored priority information for a first priority barcode, and, based on determining that the one or more features of the first barcode correspond to the stored priority information for the first priority barcode, decode the first barcode. The instructions, when executed by the at least one processor, may also cause the barcode reading apparatus to determine that one or more features of the second barcode within the image correspond to stored priority information for a second priority barcode and, based on determining that the one or more features of the second barcode correspond to the stored priority information of the second priority barcode, decode the second barcode.

The first barcode and the second barcode may include different symbology types. The first barcode may be decoded prior to decoding the second barcode based on the different symbology types.

The first barcode and the second barcode may include different polarities. The first barcode may be decoded prior to decoding the second barcode based on the different polarities.

The first barcode may be located within a first defined region within the image and the second barcode may be located within a second defined region within the image. The first barcode may be decoded prior to decoding the second barcode based on identifying that the first barcode is located within the first defined region and the second barcode is located within the second defined region.

In accordance with another aspect of the present disclosure, a barcode reading apparatus is disclosed that includes at least one processor and a non-transitory computer-readable medium. The non-transitory computer-readable medium stores instructions thereon that, when executed by the at least one processor, may cause the barcode reading apparatus to obtain an image, search the image for a first barcode using a first set of criteria for a first time period, and, if the first barcode is not found using the first set of criteria within the first time period, discard the image. The instructions, when executed by the at least one processor, may also cause the barcode reading apparatus to, if the first barcode is found using the first set of criteria within the first time period, decode the first barcode and search for a second barcode in the image using a second set of criteria for a second period of time.

The instructions, when executed by the at least one processor, may further cause the barcode reading apparatus to, if the second barcode is not found using the second set of criteria during the second period of time, discard the image. The instructions, when executed by the at least one processor, may further cause the barcode reading apparatus to, if the second barcode is found during the second period of time, decode the second barcode and output decoded data. The decoded data may be based on data generated from decoding the first barcode and the second barcode.

The first set of criteria may include one or more of a first region of interest, a first symbology type, a first polarity type, a first orientation, a first finder pattern, or a first minimum size.

The first set of criteria may be different from the second set of criteria.

The first barcode may have at least one first characteristic that makes the first barcode easier to find than the second barcode.

In accordance with another aspect of the present disclosure, a barcode reading apparatus is disclosed that includes at least one processor and a non-transitory computer-readable medium. The non-transitory computer-readable medium stores instructions thereon that, when executed by the at least one processor, may cause the barcode reading apparatus to obtain an image, search the image for a first priority barcode based on priority information, and determine, based on results of searching for the first priority barcode, whether to attempt to locate a second priority barcode.

The instructions, when executed by the at least one processor, may further cause the barcode reading apparatus to determine to not attempt to locate the second priority barcode if the results indicate the image does not include the first priority barcode.

The instructions, when executed by the at least one processor, may further cause the barcode reading apparatus to determine to not attempt to locate the second priority barcode if the results indicate the image does not include the second priority barcode.

The instructions, when executed by the at least one processor, may further cause the barcode reading apparatus to determine to not attempt to locate the second priority barcode if the results indicate the second priority barcode will be less than a minimum size.

The instructions, when executed by the at least one processor, may further cause the barcode reading apparatus to determine to not attempt to locate the second priority barcode if the results indicate the second priority barcode will have a blurriness greater than a maximum threshold.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
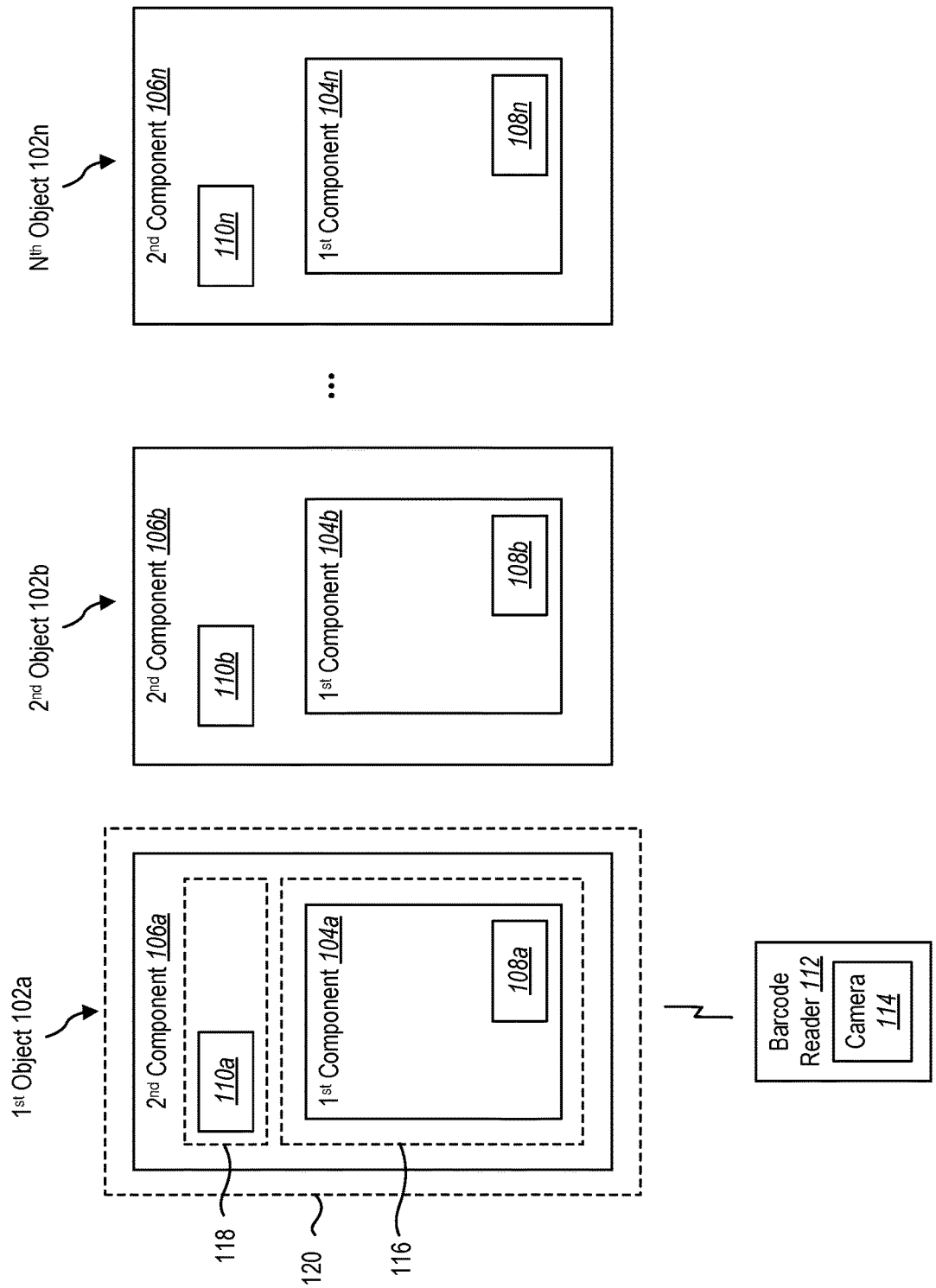
FIG. 1 illustrates an example environment in which a barcode reader may be utilized according to the present disclosure.

A barcode reader may be used to read a barcode printed or affixed to an object. In some cases, an object may include more than one barcode. For example, the object may include two or more components, and each component may have its own associated barcode. When an object includes multiple barcodes, an operator of a barcode reader may want to decode all the multiple barcodes at the same time. The barcode reader may therefore attempt to decode all the multiple barcodes from a single image. The barcode reader may attempt to locate and decode each and every one of the multiple barcodes in each image that the barcode reader captures. For example, where an object includes two associated barcodes, the barcode reader may search for both barcodes in every image that the barcode reader captures. Attempting to decode each and every expected barcode each time the barcode reader captures an image may result in inefficiencies and slow performance.

It may be advantageous for a barcode reader to first attempt to identify and decode a first barcode in a captured image and use information learned from attempting to identify and decode the first barcode to determine whether to attempt to identify and decode a second barcode. Doing so may allow the barcode reader to more quickly discard images that do not contain or are unlikely to contain readable images of both the first barcode and the second barcode. For example, if the barcode reader determines that the captured image does not contain the first barcode, the barcode reader may determine to not attempt to locate the second barcode. As another example, in a situation where the barcode reader locates the first barcode, the location, orientation, and/or size of (or other information gathered from attempting to locate) the first barcode in the captured image may indicate that the second barcode is unlikely to be in the captured image or is unlikely to be decodable. Thus, even in situations where the captured image includes the first barcode, the barcode reader may be able to determine that it is more efficient to discard the image rather than spend time searching the image for the second barcode.

The barcode reader may be able to distinguish between a first barcode and a second barcode because the first barcode may have one or more characteristics different from one or more characteristics of the second barcode. For example, the first barcode may have a first symbology, a first polarity, a first size, a first expected orientation, a first expected location, or a first finder pattern. One or more of those characteristics may be different from a second symbology, a second polarity, a second size, a second expected orientation, a second expected location, or a second finder pattern of the second barcode.

It may be advantageous for the barcode reader to prioritize attempting to read a first barcode that is easier to read than a second barcode. The barcode reader may be able to determine more quickly whether an image contains an easier to read barcode than it can determine whether the image contains a harder to read barcode. There may be various reasons that a first barcode may be easier to read than a second barcode. For example, a symbology, a size, a finder pattern, a polarity, or an expected location of a barcode may impact how easy it is for a barcode reader to read the barcode from an image.

It may be advantageous to attempt to locate and decode a first barcode by analyzing only a predefined first region of interest (which may be referred to as a first defined region) within a captured image. The first region of interest may be a region within a captured image where the first barcode is expected to be located. The first region of interest may be less than the entire captured image. If the first barcode is not included in the first region of interest, the barcode reader may discard the captured image. If the first barcode is read from the first region of interest, the barcode reader may attempt to locate and decode a second barcode in a second region of interest (which may be referred to as a second defined region).

When the first barcode is not located within the first region of interest, the captured image may be unlikely to include both the first barcode and the second barcode. For example, consider a situation where objects come off a production line with a consistent orientation from the perspective of the barcode reader. That consistent orientation may result in a first barcode appearing near the bottom of the object and a second barcode appearing near the top of the object from the perspective of the barcode reader. In those circumstances, the first region of interest may be defined as the bottom half of a captured image. If a captured image does not include the first barcode in the bottom half of the image, it may be unlikely that the captured image includes both the first barcode and the second barcode. In that situation, it may be more efficient for the barcode reader to capture and analyze a new image rather than continue analyzing the captured image.

The present disclosure is generally related to improving the efficiency of barcode reading in an environment like the one that is shown in FIG. 1, in which a barcode reader 112 is being used to read barcodes 108a-n, 110a-n on a number of objects 102a-n, and multiple barcodes 108a-n, 110a-n are attached to each of the objects 102a-n.

More specifically, FIG. 1 shows a first object 102a having a first component 104a and a second component 106a. A first priority barcode 108a may be attached to the first component 104a, and a second priority barcode 110a may be attached to the second component 106a. The first priority barcode 108a and the second priority barcode 110a may have significantly different characteristics. For example, the first priority barcode 108a may be relatively large and easy to read, whereas the second priority barcode 110a may be relatively small and difficult to read (or vice versa). The other objects 102b-n may be configured similarly to the first object 102a.

The objects 102a-n may take a variety of different forms. For example, the objects 102a-n may be items that are produced in a manufacturing plant, products that are part of a store's inventory, medical supplies at a hospital or other medical facility, etc. The components 104a-n, 106a-n may be connected or attached to one another to form the objects 102a-n. For example, if the objects 102a-n are parts to be used in electronic devices, the second components 106a-n may be printed circuit boards (PCBs) and the first components 104a-n may be items (e.g., batteries) that are attached to the PCBs.

The barcode reader 112 (or simply "reader 112") may include a camera 114 (or other barcode reading device). The reader 112 may be capable of operating in a presentation mode (e.g., a video capture mode) in which the camera 114 continuously captures images and attempts to decode barcodes in the images. FIG. 1 shows an image 120 of the first object 102a that may be captured by the camera 114. As used herein, a presentation mode may include similar features and functionality as one or more modes described in U.S. application Ser. No. 15/792,608, titled MOBILE DEVICE CONFIGURED TO USE MOTION DETECTION TO OPTIMIZE ACTIVATION OF VIDEO CAPTURE FOR FAST DECODING, filed on Oct. 24, 2017, and which is incorporated by reference in its entirety.

If the reader 112 is in presentation mode when it is being used to read the barcodes 108a-n, 110a-n on the objects 102a-n, then the reader 112 may capture a number of images while the reader 112 is in motion. Alternatively, the images may be captured and read while the objects 102a-n are moving with respect to a stationary barcode reader 112. In either case, some of the images captured by the reader 112 may be undecodable. For example, some of the images may be blurry, may not include any barcodes at all, may include only one of the two barcodes on an object, or may include both barcodes but only one of the two barcodes is decodable. If the reader 112 attempts to decode barcodes in these types of images, this wastes time and increases the overall amount of time that is required to read the barcodes 108a-n, 110a-n.

In some implementations, the barcodes 108a-n, 110a-n may be positioned within pre-defined regions 116, 118 on the components 104a-n, 106a-n of the objects 102a-n. For example, FIG. 1 shows a first region 116 and a second region 118 in relation to the components 104a, 106a of the first object 102a. Whomever (or whatever) is responsible for attaching the barcodes 108a, 110a to the components 104a, 106a of the first object 102a may intentionally position the first priority barcode 108a somewhere within the first region 116 and the second priority barcode 108b somewhere within the second region 118. The other barcodes 108b-n, 110b-n may be positioned within similar regions on the components 104b-n, 106b-n of the other objects 102b-n. Knowing approximately where the barcodes 108a-n, 110a-n are positioned may be used to improve the speed of reading the barcodes 108a-n, 110a-n.

For example, the first region 116 may be used to define a first region of interest, and the second region 118 may be used to define a second region of interest. The first region of interest may be a pre-defined portion of captured images that the reader 112 searches in attempting to locate and decode the first priority barcodes 108a-n, and the second region of interest may be a pre-defined portion of captured images that the reader 112 searches in attempting to locate and decode the second priority barcodes 110a-n. The first region of interest may represent a pre-defined portion of captured images in which the first priority barcodes 108a-n are expected to appear when the reader 112 and the objects 102a-n are positioned as expected or recommended for reading the barcodes 108a-n, 110a-n. The barcode operator or manufacturer of the objects 102a-n may provide information on the expected or recommended positioning of the reader 112 and the objects 102a-n. The expected or recommended positioning may be positioning such that captured images contain decodable versions of both the first priority barcodes 108a-n and the second priority barcodes 110a-n. The second region of interest may represent a similar pre-defined portion of captured images except with respect to the second priority barcodes 110a-n. By way of example, the first region of interest may be defined as the portion of the image 120 outlined by the dotted line representing the first region 116, and the second region of interest may be defined as the portion of the image 120 outlined by the dotted line representing the second region 118. In that case, it may be expected or recommended that the reader 112 be positioned for purposes of reading the barcodes 110a-n, 108a-n such that its field of view approximately outlines the objects 102a-n.

Figure 2:
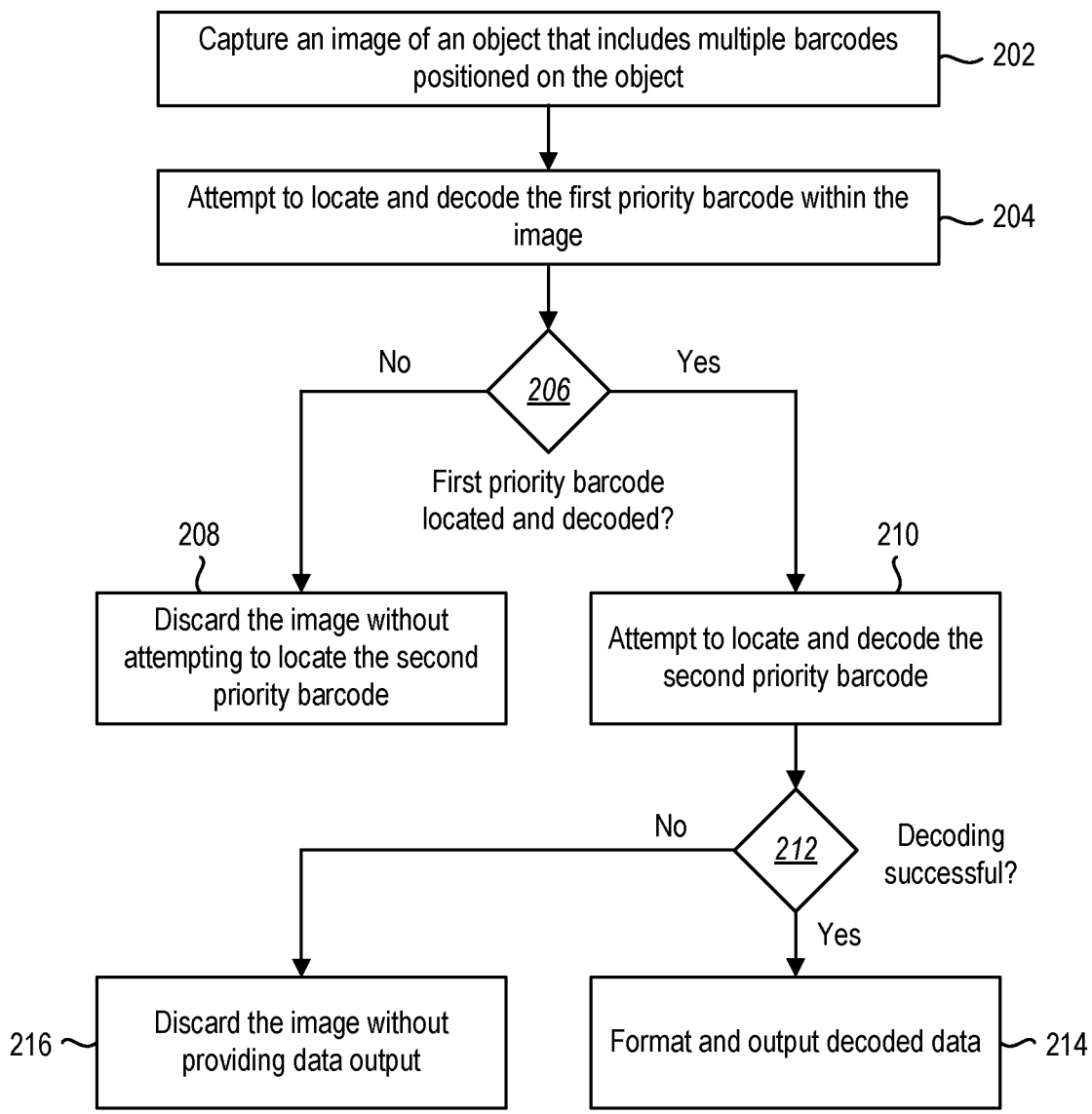
FIG. 2 illustrates an example method for reading barcodes using a barcode reader.

Reference is now made to FIG. 2, which illustrates an example of a method 200 for reading the barcodes 108a-n, 110a-n that may be implemented by the reader 112. In accordance with the method 200, the reader 112 may capture 202 an image 120 of a first object 102a that includes a first priority barcode 108a (which may be positioned on a first component 104a) of the first object 102a and a second priority barcode 110a (which may be positioned on a second component 106a) of the first object 102a.

Figure 3:
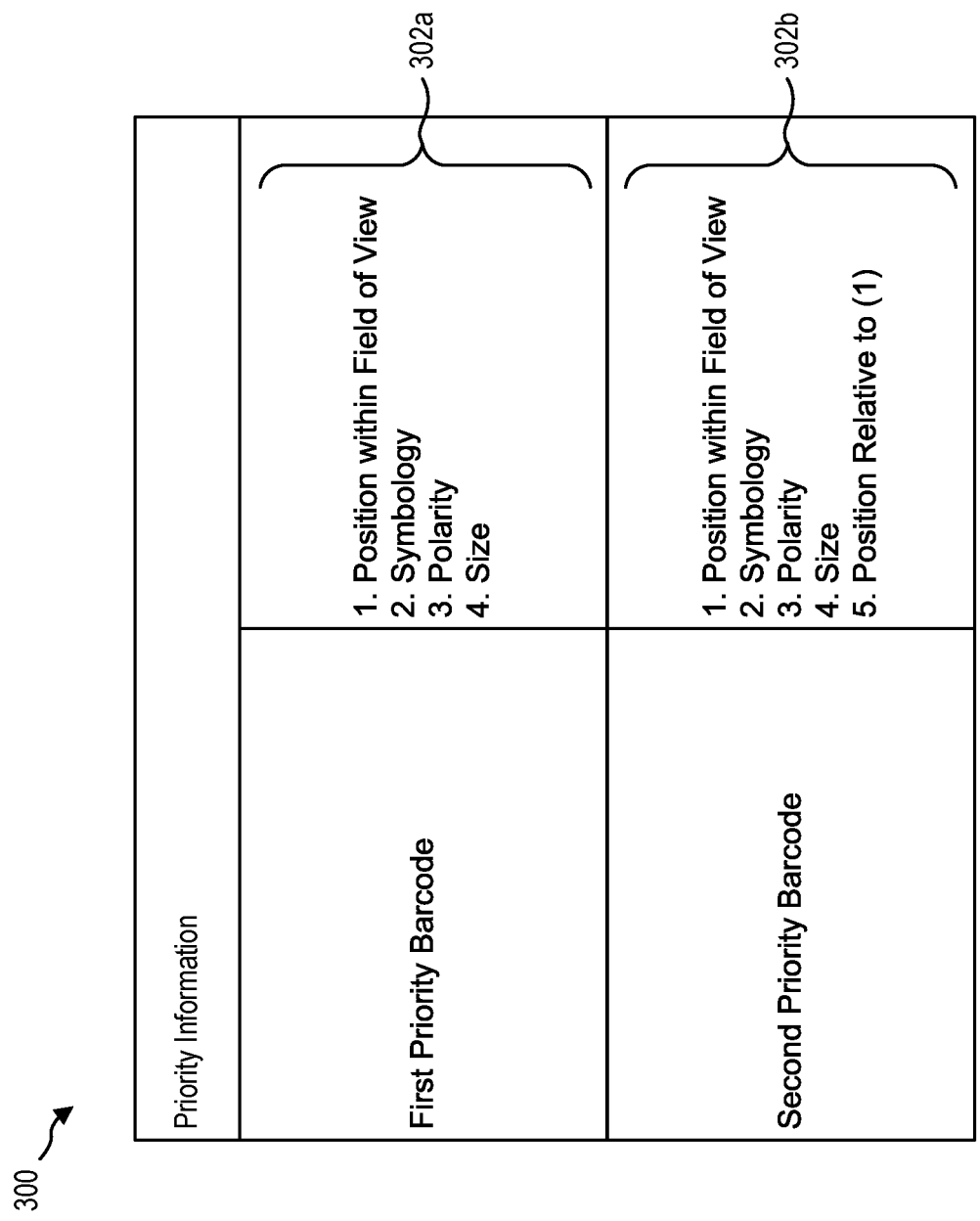
FIG. 3 illustrates an example record of priority information.

In the present example, the barcode reader 112 may know in advance how to identify barcodes by priority. For instance, FIG. 3 illustrates an example record 300 of priority information, including priority information corresponding to the respective priority barcodes, which may be stored on the barcode reader 112. As shown in FIG. 3, the record 300 of priority information includes first priority information 302a corresponding to the first priority barcode 108a and second priority information 302b corresponding to the second priority barcode 110a.

As indicated above, the first priority barcode 108a may be easier to read than the second priority barcode 110a. FIG. 3 depicts the first priority information 302a corresponding to the first priority barcode 108a that may be stored within the barcode reader 112. The first priority information 302a includes information that the reader 112 may use in attempting to locate and decode the first priority barcode 108a. The second priority information 302b includes information that, if the first priority barcode 108a is located and decoded, is further used by the reader 112 in attempting to locate and decode the second priority barcode 110a.

The first priority barcode 108a may be identified by, for example, its position within the field of view of the reader 112 (as discussed above), the symbology (for example a Datamatrix), its polarity (discussed more below), or its size (actual data size or size relative to the field of view).

The second priority barcode 110a may be identified by, for example, its position within the field of view of the reader 112 (as discussed above), the symbology (for example a Datamatrix), its polarity (discussed more below), its size (actual data size or size relative to the field of view), or its position relative to the first priority barcode 108a.

Thus, in accordance with the method 200, the reader 112 may attempt 204 to locate and decode the first priority barcode 108a before attempting to locate and decode the second priority barcode 110a, which may be prior to attempting to locate and decode a third priority barcode (not shown). The reader 112 may also determine, based on the results of attempting 204 to locate and decode the first priority barcode 108a, whether or not to attempt to locate the second priority barcode 110a within the image.

More specifically, the reader 112, at step 204, uses the first priority information 302a as described in FIG. 3 to attempt to locate and decode the first priority barcode 108a. More specifically, the reader does not attempt to decode any candidate barcode or candidate region that appears to contain a barcode if the candidate barcode or region is not consistent with the first priority barcode (e.g. wrong position, wrong symbology, wrong polarity, wrong size, etc.).

If the reader 112 determines at step 206 that the reader 112 is unable to locate and decode the first priority barcode 108a, the reader 112 may discard 208 the image 120 without attempting to locate and decode the second priority barcode 110a in the image 120, thus avoiding expenditure of unnecessary computing resources.

In some implementations, a maximum allowable time period (e.g., a threshold period of time) may be defined for attempting 204 to locate and decode the first priority barcode 108a. If the reader 112 does not locate the first priority barcode 108a within the defined maximum allowable time period, then the reader 112 may determine 206 that it is unable to locate the first priority barcode 108a. The reader 112 may therefore discard 208 the image 120 and any previously decoded data (e.g., decoded data obtained from decoding the first priority barcode 108a) without attempting to additionally locate and decode the second priority barcode 110a, as mentioned above.

If, however, the reader 112 determines 206 that it is able to locate and decode the first priority barcode 108a in accordance with the first priority information 302a, the reader 112 may attempt 210 to locate and decode the second priority barcode 110a using the second priority information 302b. In some implementations, a maximum allowable time period may be defined for attempting 210 to decode the second priority barcode 110a. If the reader 112 does not decode the second priority barcode 110a within the defined maximum allowable time period, then the reader 112 may determine 212 that decoding is unsuccessful. As shown in FIG. 2, in response to determining 212 that the decoding is unsuccessful, the reader 112 may discard 216 the image 120 without providing a data output.

If all the priority barcodes (e.g., first priority barcode 108a and second priority barcode 110a) in the priority information are successfully located and decoded, the decoded data (of all barcodes) may be formatted and output at step 214. For instance, as shown in the example of FIG. 2, the barcode reader 112 (or other connected computing device) may format 214 and output decoded data in response to determining 212 that the decoding was successful.

Advantageously, the method 200 may reduce the amount of time spent processing undecodable candidate regions of the images, thereby improving efficiency by speeding up the overall process of decoding the barcodes 108a-n, 110a-n. Instead of always looking for both the first priority barcode 108a and the second priority barcode 110a in an image 120, the reader 112 may be able to skip any processing related to the second priority barcode 110a if the first priority barcode 108a is not found or is not decodable or if the reader 112 learns information in searching for the first priority barcode 108a indicating that the image 120 does not contain or is insufficiently likely to contain a decodable second priority barcode 110a.

As mentioned above, and as illustrated in the Figures, the first priority barcode 108a is positioned somewhere within a first region 116 of the first object 102a while the second priority barcode 110a is positioned somewhere within a second region 118 of the first object 102a. In one or more configurations, the first priority barcode 108a is easier to read than the second priority barcode 110a (e.g., based on the priority information discussed above in connection with FIG. 3).

There are a number of alternatives to what is shown and described in relation to FIGS. 1-3 that fall within the scope of the present disclosure. For example, it is not necessary for the reader 112 to be operating in presentation mode. Instead, the method 200 may be performed by a reader 112 that captures images only when some type of trigger is activated by the user. Also, the method 200 may be performed with respect to objects that include more than two barcodes.

The dimensions and positions of the regions 116, 118 used to define positions within the field of view may be varied. By way of example, these may be stored as regions within the priority information by a user using an external tool for defining the regions or may be developed by the barcode reader based on locations of the first priority barcode and the second priority barcode during previously successful decoding attempts.

In some implementations, the regions 116, 118 could be eliminated altogether. In other words, there may not be any constraints on where the barcodes 108a-n, 110a-n are placed on the objects 102a-n. In those types of implementations, the reader 112 may attempt to locate the first priority barcode 108a within the entire image 120 (instead of just within the part of the image 120 corresponding to the first region 116). If the reader 112 is able to successfully decode the first priority barcode 108a, the reader 112 may then attempt to locate the second priority barcode 110a within the entire image 120.

When regions are not used, other priority information is used to identify the first priority barcode and the second priority barcode. For example, in one or more implementations, the barcode reader can use priority information discussed above in connection with FIG. 3.

Stated another way, implementations where there are no constraints on where the barcodes 108a-n, 110a-n are placed on the objects 102a-n, one issue that may arise is how to distinguish the barcodes 108a-n, 110a-n from one another (so that, for example, the reader 112 doesn't mistakenly identify the second priority barcode 110a in an image 120 as the first priority barcode 108a).

In one or more implementations, the symbology type of the priority barcodes may be used. For example, the priority information 302a-b may include symbology information, including, for example, an indication that the first priority barcode is a linear barcode while the second priority barcode is a Datamatrix (or vice versa).

As another example, polarity of the priority barcodes may be used. It may be advantageous for the polarities of the barcodes 108a-n, 110a-n to be opposite one another. For example, the priority information may include an indication that the first priority barcodes 108a-n placed on the first components 104a-n have a first polarity (e.g., dark on light), and the second priority barcodes 110a-n placed on the second components 106a-n have a second polarity (e.g., light on dark). In this case, the reader 112 may initially search for a barcode 108a that has a particular polarity, and may be able to distinguish that barcode 108a from another barcode 110a in the image 120 that has a different polarity.

Instead of (or in addition to) using different polarities, the characteristics of the barcodes 108a-n, 110a-n may be varied in other ways (e.g., as indicated in the priority information) in order to make it easier to distinguish the barcodes 108a-n, 110a-n from one another. For example, the barcodes 108a-n, 110a-n may differ in size (e.g., the barcodes 108a-n may be larger than the barcodes 110a-n, or vice versa). As another example, the barcodes 108a-n, 110a-n may use different symbology types (e.g., the barcodes 108a-n may be one-dimensional barcodes, whereas the barcodes 110a-n may be two-dimensional barcodes). As another example, the finder patterns in the barcodes 108a-n, 110a-n may have different complexities (e.g., the finder pattern in the barcodes 108a-n may be more distinct and easier to locate than the finder pattern in the barcodes 110a-n).

Figure 4:
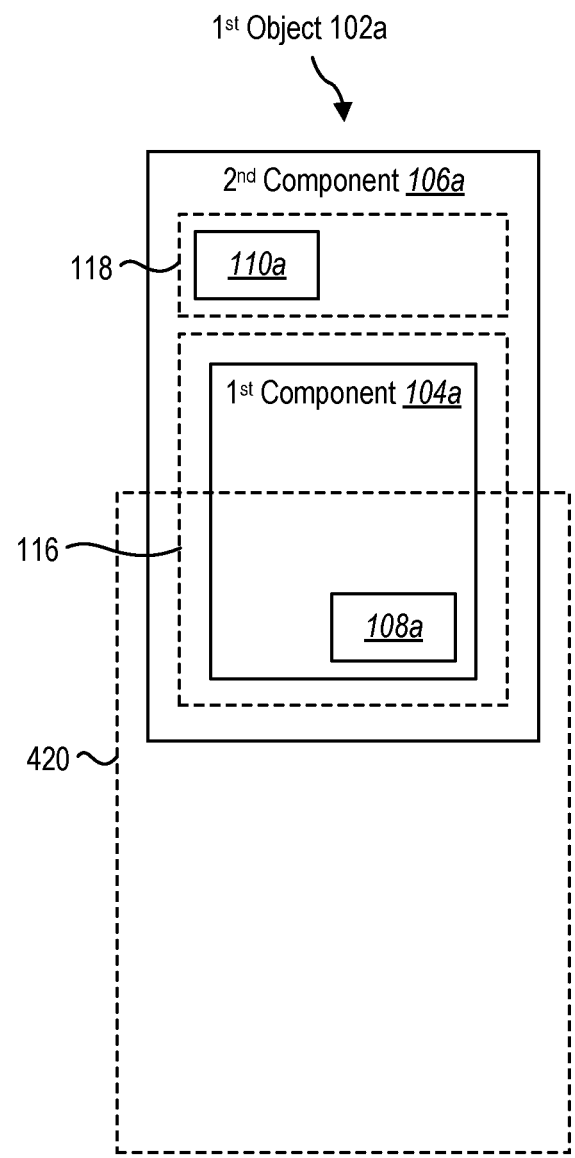
FIG. 4 illustrates an example image of an object that may have been captured using a barcode reader.

In FIG. 1, the entire first object 102a is visible in the image 120, including both of the barcodes 108a, 110a. However, under some circumstances, the reader 112 may capture images in which only a single barcode is visible. For example, FIG. 4 shows an image 420 of the first object 102a that includes the first priority barcode 108a but does not include the second priority barcode 110a. Such an image 420 may be captured, for example, while the reader 112 is being moved into position to read the barcodes 108a, 110a on the first object 102a or the first object 102a is being moved relative to a stationary barcode reader 112.

In some implementations, the minimum distance and relative positions and orientations between the barcodes 108a, 110a may be known in advance. In such implementations, the reader 112 may use this distance and orientation information to determine whether to search for the second priority barcode 110a. More specifically, the reader 112 may determine the position, the orientation, and the size of the first priority barcode 108a in the image 420. Then, based on the distance and orientation between the first priority barcode 108a and the second priority barcode 110a (which, as indicated, may be known in advance to the reader 112), the reader 112 may be able to determine whether it is possible for the second priority barcode 110a to be visible within the image 420. If it is not possible for the second priority barcode 110a to be visible within the image 420, then the reader 112 may discard the image 420 without searching for the second priority barcode 110a. The reader 112 also may be able to determine whether it is sufficiently likely that the second priority barcode 110a will be visible within and decodable from the image 420. If it is not sufficiently likely, then the reader 112 may discard the image 420 without searching for the second priority barcode 110a.

Figure 5:
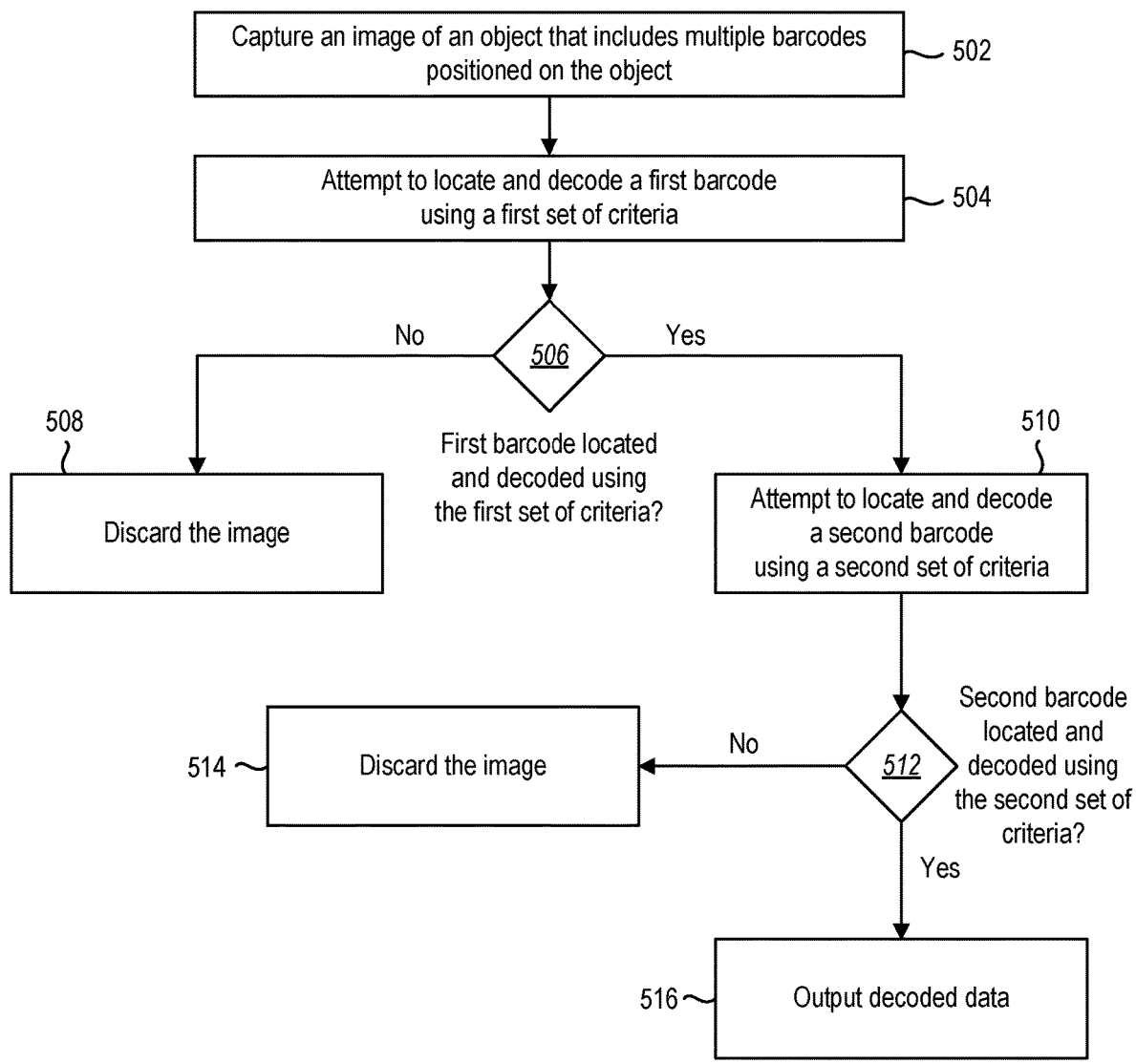
FIG. 5 illustrates an example method for reading multiple barcodes using sets of criteria.

FIG. 5 illustrates one potential method 500 for reading the barcodes 108a-n, 110a-n that may be implemented using the reader 112.

The reader 112 may capture 502 an image of an object (such as the object 102a) that includes multiple barcodes (such as barcodes 108a, 110a) positioned on the object. Although this method is described using two barcodes, the method could be implemented for objects that have more than two barcodes.

The reader 112 may attempt 504 to locate and decode a first barcode (such as the first priority barcode 108a) using a first set of criteria. The reader 112 may locate the first barcode when the reader 112 locates a barcode in the image that satisfies the first set of criteria. The reader 112 may attempt to decode the first barcode once it has located the first barcode. In the alternative, the reader 112 may not attempt to decode the first barcode until after determining that an image also includes a second barcode.

The first barcode may have one or more first characteristics. One example first characteristic may be that the first barcode is associated with a first component of an object. Taking FIG. 1 as an example the first priority barcode 108a may be considered the first barcode, and the first priority barcode 108a may be associated with the first component 104a. Other potential examples of the one or more first characteristics may be that the first barcode has a first symbology, a first polarity, a first finder pattern, or a first actual size. The one or more first characteristics of the first barcode may be different from one or more second characteristics of a second barcode. The reader 112 may use one or more differences between the first barcode and the second barcode to distinguish the first barcode from the second barcode.

One or more differences between the one or more first characteristics and the one or more second characteristics may make the first barcode easier for the reader 112 to read than the second barcode. One or more differences between the one or more first characteristics and the one or more second characteristics may mean the reader 112 can locate and decode the first barcode faster than it can locate and decode the second barcode. One or more differences between the one or more first characteristics and the one or more second characteristics may allow the reader 112 to determine whether an image includes the first barcode more quickly than it can determine whether the image includes the second barcode. One or more differences between the first characteristics and the one or more second characteristics may mean that the reader is less likely to fail to locate and decode the first barcode when the first barcode is present in an image than the reader is to fail to locate and decode the second barcode when the second barcode is present in an image.

The first set of criteria may include one or more criteria defining how the reader 112 will search for the first barcode in the image and determine whether the reader 112 has located the first barcode in the image. The first set of criteria may be optimized for the first barcode. In other words, the first set of criteria may be defined based on the one or more characteristics of the first barcode in order to make locating and decoding the first barcode as fast as possible. The first set of criteria may also be defined based on characteristics of the environment in which the reader 112 will attempt to read the first barcode. For example, the objects 102a-n may be intended to have a particular orientation in relation to the reader 112. The first set of criteria may be stored in a storage device on the reader 112.

The first set of criteria may define a first region of interest of the image. The first region of interest may encompass the entire image or less than the entire image. The first region of interest may include non-adjacent areas of the image. When the first set of criteria defines a first region of interest, the reader 112 may search only the first region of interest in attempting to locate the first barcode. In the alternative, the reader 112 may determine that a barcode located in the image is not the first barcode unless the barcode is located in the first region of interest. Thus, in situations where the first barcode is located in an image but not in the first region of interest, the reader 112 may not locate the first barcode using the first set of criteria.

The first region of interest may be defined based on an expected location of the first barcode within an image. The first barcode may be expected to appear in a particular portion of the object. The object may also be intended, expected, or recommended to be scanned while in a particular orientation and position relative to the reader 112. The intended, expected, or recommended positioning of the reader 112 and the objects may be application specific. The first region of interest may be defined to be the portion of the image corresponding to the particular portion of the object where the first barcode is expected to be positioned. For example, assume that the first barcodes are intended to be positioned in a bottom third of objects. Assume also that the reader 112 is intended to be placed in a position relative to the objects such that the bottoms of the objects are located at the bottom of the field of view of the reader 112. In that case, the first region of interest may be defined as the bottom third of captured images. As another example, looking at FIG. 1, the first priority barcodes 108a-n may be intended to be positioned in the first region 116 of the objects 102a-n. The objects 102a-n may be intended to be presented to the reader 112 such that the first priority barcodes 108a-n appear in an area of the field of view of the reader 112 corresponding to the first region 116. In that case, the first region of interest may be defined as the area represented by the first region 116 but where the first region 116 represents an area of the image 120 rather than the object 102a.

The image may be unlikely to include the first barcode if the first barcode is not in the first region of interest. For example, assume a situation in which the reader 112 is fixed in position and operating in presentation mode. Further assume that objects are uniformly moving across a field of view of the reader 112 such that whenever the first barcode moves into the field of view of the reader 112, the first barcode appears in the bottom third of the field of view of the reader 112. In those circumstances, the first region of interest may be defined as the bottom third of an image. When the reader 112 captures an image before an object has moved into the field of view of the reader 112, the first barcode will not appear in the first region of interest and will also not be present in another portion of the image. Thus, the reader 112 will determine that the first region of interest does not include the first barcode and may discard the image rather than search the remainder of the image for the first barcode.

The image also may be unlikely to include the second barcode if the first barcode is not in the first region of interest. The example described in the previous paragraph illustrates such a situation. As another example, consider a situation where an operator of the reader 112 manually moves the reader 112, and the reader 112 operates in presentation mode. Also assume objects on which the first barcode and the second barcode are positioned are intended to be positioned relative to the reader 112 like the objects 102a-n shown in FIG. 1. Further assume that the first barcode is intended to be positioned in the bottom third of the objects, the second barcode is intended to be positioned in the top third of the objects, and the first region of interest is defined as the bottom third of an image. Assume the operator is moving the reader 112 such that a top of a field of view of the reader 112 is moving from a bottom of the first object 102a toward a top of the first object 102a. Assume that while the reader 112 is moving, the reader 112 captures an image in which the first barcode appears in the top third of the image. In that case, the first barcode will not be in the first region of interest, and the second barcode will not be in the image. FIG. 4 helps illustrate this example. Assume for purposes of this example that the first priority barcode 108a shown in FIG. 4 is the first barcode of this example and the second priority barcode 110a shown in FIG. 4 is the second barcode of this example. In FIG. 4, the first priority barcode 108a does not appear in the bottom third of the image 420, and the second priority barcode 110a does not appear in the image 420. In this case, it may be advantageous for the reader 112 to discard the image after failing to locate the first barcode in the first region of interest rather than search for the second barcode.

The first region of interest may be defined based in part on an expected location of the second barcode relative to the first barcode. The size or location of the first region of interest may be defined based on where on the object the second barcode is located relative to the first object. For example, consider a situation where the first barcode is on one end of the object and the second barcode is on the other end of the object. It may be that when the barcode is positioned close enough to the object to read the first barcode and the second barcode but still far enough away to include both the first barcode and the second barcode in the image, the distance between the first barcode and the second barcode is such that the area of the image in which the first barcode can be located is a small region of the image.

It may be that the smaller the size of the first region of interest, the faster the reader 112 can determine whether the reader 112 can locate the first barcode using the first set of criteria.

The first set of criteria may define a first symbology type. The reader 112 may be configured to determine that any barcode within an image that is not the first symbology type is not the first barcode. It may be that the first symbology type for the first barcode is different from a second symbology type of a second barcode.

The first set of criteria may define a first polarity type for the first barcode. The reader 112 may be configured to determine that any barcode within an image that is not the first polarity type defined in the first set of criteria is not the first barcode. It may be that the first polarity type for the first barcode is different from a polarity type of a second barcode.

The first set of criteria may define a first minimum size, a first maximum size, or both. The first minimum size and the first maximum size may be defined in terms of actual data size or size relative to the field of view. The reader 112 may be configured to determine that any barcode within an image that is not equal to or larger than the first minimum size or equal to or smaller than the first maximum size is not the first barcode. Thus, an image may include a barcode having the characteristics of the first barcode, but the reader 112 may not locate the first barcode using the first set of criteria because the first barcode is too small or too large. It may be that if the first barcode is less than the first minimum size, the second barcode may likely be too small for the reader 112 to locate and decode the second barcode. It may be that if the first barcode is greater than the first maximum size, the second barcode may likely not appear in the image. The first minimum size or first maximum size of the first barcode may be different from a second minimum size or second maximum size of a second barcode.

The first set of criteria may define one or more first relative positions. The one or more first relative positions may include a position in an image relative to one or more edges or corners of an image, a position in an image relative to a fixed position in the image, or a position in an image relative to another object appearing in the image. If the first barcode does not appear at one of the one or more first relative positions in an image, the image may be unlikely to contain the second barcode.

The first set of criteria may define a first orientation. The first orientation may be different from a second orientation of a second barcode.

The first set of criteria may define a first finder pattern. The first finder pattern may be different from a second finder pattern of a second barcode.

The first set of criteria may define a first blurriness threshold. The first blurriness threshold may be such that if the first barcode is blurrier than the first blurriness threshold, the reader 112 is unlikely to be able to read a second barcode.

The reader 112 may apply the one or more criteria included in the first set of criteria in a particular order. The order in which to apply the one or more criteria included in the first set of criteria may be defined and stored on a storage device on the reader 112. For example, assume a first set of criteria defines a first region of interest and a first symbology type. One possible order in which to apply the first set of criteria is to first apply the first region of interest and then apply the first symbology type. In that case, the reader 112 may first identify the first region of interest in an image and then determine whether the first region of interest includes a barcode having the first symbology type. The other possible order is to first apply the first symbology type and then apply the first region of interest. In that case, the reader 112 may search an entire image for a barcode having the first symbology type and then determine whether that barcode is located in the first region of interest.

The reader 112 may attempt 504 to locate and decode the first barcode for a first maximum period of time. The first maximum period of time may be a length of time after which the reader 112 will stop attempting to locate (or locate and decode) the first barcode. For example, assume a first maximum period of time of 100 ms. The reader 112 may spend 100 ms attempting 504 to locate and decode the first barcode. Even if at the end of a period of 100 ms the reader 112 has not located the first barcode, the reader 112 may stop attempting to locate the first barcode.

The reader 112 may determine 506 whether the reader 112 has located the first barcode using the first set of criteria. The reader 112 may also determine whether the reader 112 has decoded the first barcode. If the reader 112 determines that the reader 112 has not located (or has not located and decoded) the first barcode using the first set of criteria, the reader 112 may discard 508 the image.

If the reader 112 determines that the reader 112 has located (or located and decoded) the first barcode using the first set of criteria, the reader 112 may attempt 510 to locate and decode a second barcode using a second set of criteria. The reader 112 may locate the second barcode when the reader 112 locates a barcode in the image that satisfies the second set of criteria. If the reader 112 locates the second barcode, the reader 112 may attempt to decode the second barcode. In the alternative, the reader 112 may first decode the first barcode (if it has not been previously decoded) and then decode the second barcode.

The second barcode may have one or more second characteristics. One example second characteristic may be that the second barcode is associated with a second component of an object. The second component of the object with which the second barcode is associated may be different from the first component of the object with which the first barcode is associated. Taking FIG. 1 as an example the second barcode may be a barcode associated with the second component 106*a*, such as the second priority barcode 110*a*. The one or more second characteristics may also include a second symbology, a second polarity, a second finder pattern, or a second actual size. One or more of the one or more second characteristics of the second barcode may be different from one or more of the one or more first characteristics of the first barcode. One or more of the one or more second characteristics of the second barcode may make the second barcode more difficult to read than the first barcode.

The second set of criteria may include one or more criteria defining how the reader 112 will search for the second barcode and how the reader 112 will determine whether it has located the second barcode. The second set of criteria may be optimized for the second barcode. The second set of criteria may be stored in a storage device on the reader 112.

One or more differences between the first set of criteria and the second set of criteria may make it easier to attempt to locate and decode the first barcode using the first criteria than to attempt to locate and decode the second barcode using the second criteria. One or more differences between the first set of criteria and the second set of criteria may make it faster to attempt to locate and decode the first barcode using the first criteria than to attempt to locate and decode the second barcode using the second criteria. One or more differences between the first set of criteria and the second set of criteria may allow the reader 112 to determine whether it can locate and decode the first barcode using the first criteria more quickly than it can determine whether it can locate and decode the second barcode using the second criteria. One or more differences between the first set of criteria and the second set of criteria may mean that the reader 112 is less likely to fail to locate and decode the first barcode using the first set of criteria when the first barcode is present in an image than the reader 112 is to fail to locate and decode the second barcode using the second set of criteria when the second barcode is present in an image.

The second set of criteria may define a second region of interest of the image. The second region of interest may encompass the entire image or less than the entire image. The second region of interest may include non-adjacent areas of the image. The second region of interest may overlap with the first region of interest defined in the first set of criteria. When the second set of criteria defines a second region of interest, the reader 112 may search only the second region of interest in attempting to locate the second barcode. In the alternative, the reader 112 may determine that a barcode located in the image is not the second barcode unless the barcode is located in the second region of interest. Thus, an image may include the second barcode, but the reader 112 may not locate the second barcode using the second set of criteria because the second barcode is not located in the second region of interest.

The second region of interest may be defined based on an expected location of the second barcode on the image. The second region of interest may be defined based on an expected position of the barcode 112 relative to the object. The second barcode may be expected to appear in a particular portion of the object. The object also may be intended or expected to be scanned while in a particular orientation and position relative to the reader 112. The image may be unlikely to include the second barcode if the second barcode is not in the second region of interest. The image may be unlikely to include the first barcode if the second barcode is not in the region of interest. The image may be unlikely to include a third barcode (not shown) if the second barcode is not in the second region of interest. The second region of interest may also be defined in part based on the definition of the first region of interest.

The second set of criteria may define a second symbology type. The reader 112 may determine that any barcode within an image that is not the second symbology type defined in the second set of criteria is not the second barcode. The second symbology type for the second barcode may be different from the first symbology type of the first barcode.

The second set of criteria may define a second polarity type for the second barcode. The reader 112 may determine that any barcode within an image that is not the second polarity type defined in the second set of criteria is not the second barcode. The second polarity type for the second barcode may be different from the first polarity type of the first barcode.

The second set of criteria may define a second minimum size, a second maximum size, or both. The sizes may be defined in terms of actual data size or size relative to the field of view. The reader 112 may be configured to determine that any barcode within an image that is not larger than or equal to the second minimum size or smaller than or equal to the second maximum size is not the second barcode. Thus, it may be that an image includes a barcode having the characteristics of the second barcode but the reader 112 does not locate the second barcode using the second set of criteria because the second barcode is too small or too large. The second minimum size or the second maximum size of the second barcode may be different from the first minimum size or the first maximum size of the first barcode. It may be that if the second barcode is less than the second minimum size, a third barcode (not shown) may likely be too small for the reader 112 to locate and decode.

The second set of criteria may define one or more second relative positions. The one or more second relative positions may include a position in an image relative to one or more edges or corners of an image, a position in an image relative to a fixed position in the image, or a position in an image relative to another object appearing in the image. It may be that if the second barcode does not appear at one of the one or more second relative positions in an image, the image will not or is unlikely to contain one or more other barcodes.

The second set of criteria may define a second orientation. The second orientation may be different from the first orientation of the first barcode.

The second set of criteria may define a second finder pattern. The second finder pattern may be different from the first finder pattern of the first barcode.

The second set of criteria may define a second blurriness threshold. The second blurriness threshold may be different from the first blurriness threshold.

The reader 112 may apply the one or more criteria included in the second set of criteria in a particular order. The order in which to apply the one or more criteria included in the second set of criteria may be defined and stored on a storage device of the reader 112.

The reader 112 may attempt 510 to locate (or locate and decode) the second barcode for a second maximum amount of time. The second maximum amount of time for attempting 510 to locate (or locate and decode) the second barcode may be more than, less than, or equal to the first maximum period of time for locating (or locating and decoding) the first barcode. The second maximum amount of time for attempting 510 to locate (or locate and decode) the second barcode may depend in part on an amount of time the reader 112 spent locating (or locating and decoding) the first barcode. The second maximum amount of time may be based on whether the reader 112 located (or located and decoded) the first barcode.

The reader 112 may determine 512 whether the reader 112 has located the second barcode. The reader 112 may also determine 512 whether the reader 112 has decoded the second barcode.

If the reader 112 does not locate (or does not locate and decode) the second barcode in an image, the reader 112 may discard 514 the image.

If the reader 112 locates the second barcode in an image, the reader 112 may decode the second barcode and output 516 decoded data. The decoded data may include data generated from decoding the first barcode, which may be first decoded data, and data generated from decoding the second barcode, which may be second decoded data. The reader 112 may format or otherwise process the first decoded data, the second decoded data, or both and output the formatted or processed data as the decoded data.

Figure 6:
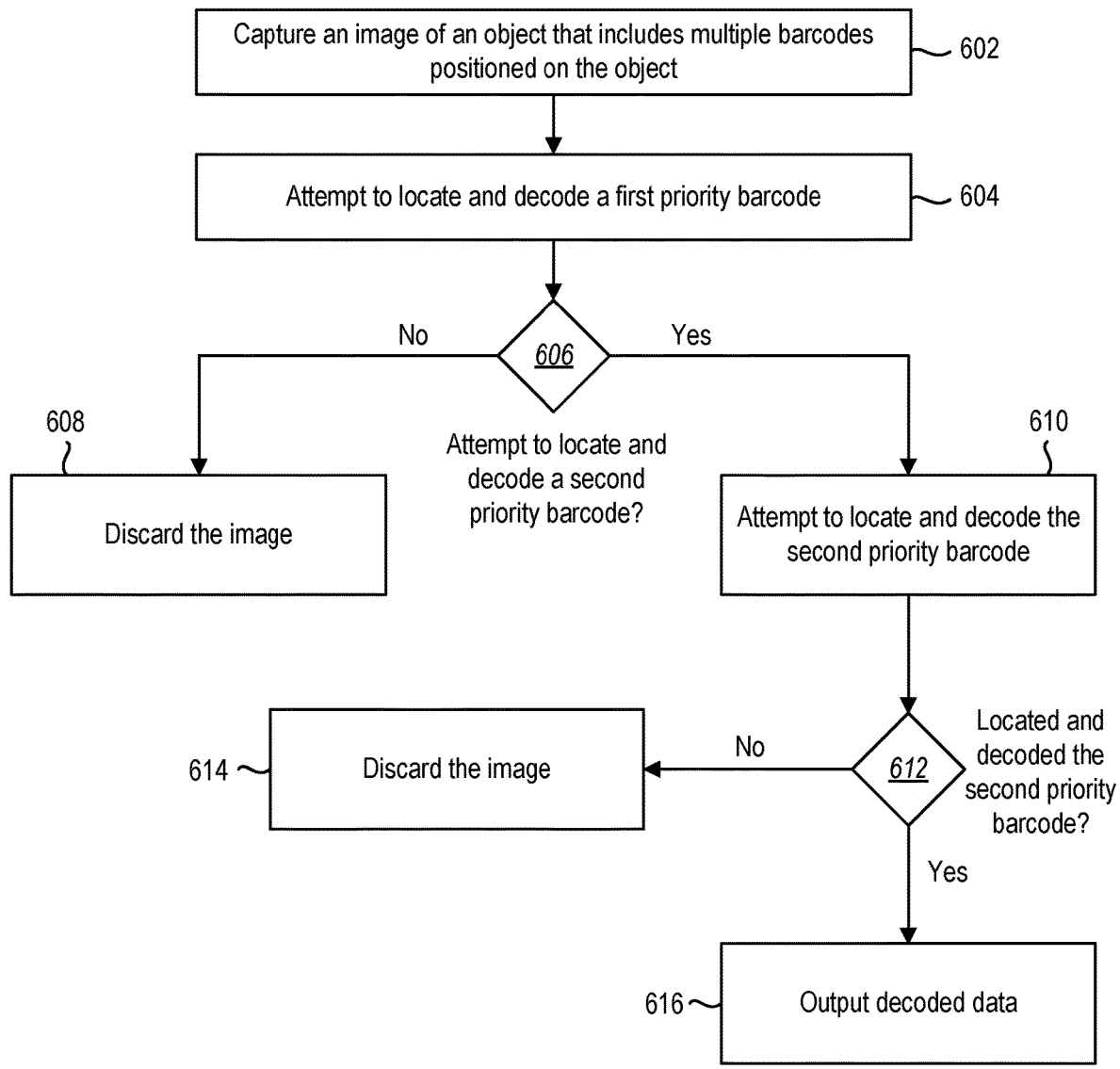
FIG. 6 illustrates an example method for reading multiple prioritized barcodes.

FIG. 6 illustrates an example method 600 for reading the barcodes 108a-n, 110a-n that may be implemented using the reader 112.

The reader 112 may capture 602 an image of an object (such as the object 102a) that includes multiple barcodes (such as barcodes 108a, 110a) positioned on the object.

The reader 112 may attempt 604 to locate (or locate and decode) a first priority barcode (such as the first priority barcode 108a) within the image. The reader may attempt 604 to locate (or locate and decode) the first priority barcode for a maximum period of time. The reader 112 may attempt 604 to locate (or locate and decode) the first priority barcode using first priority information, such as the first priority information 302a. The first priority information may include information regarding a first region of interest, a first symbology, a first polarity, a first size, a first finder pattern, or a first orientation. Attempting to locate the first priority barcode may include attempting to locate a barcode in an image that is consistent with the first priority information.

The first priority barcode may have one or more first characteristics. The first priority barcode may be a barcode associated with a first component (such as the first component 104a) that forms part of the object. The first priority barcode may have a first symbology, a first polarity, a first finder pattern, or a first actual size. The reader 112 may prioritize attempting to locate and decode the first priority barcode (as opposed to one or more other barcodes positioned on the object) because one or more of the one or more first characteristics of the first priority barcode make the first priority barcode easier to locate and decode than the one or more other barcodes that may be positioned on the object.

The reader 112 may determine 606 whether to attempt to locate and decode a second priority barcode (such as the second priority barcode 110a). The second priority barcode may have one or more second characteristics. The second priority barcode may be a barcode associated with a second component (such as the second component 106a) that forms part of the object. The second priority barcode may have a second symbology, a second polarity, a second finder pattern, or a second actual size. The reader 112 may determine 606 whether to attempt to locate and decode the second priority barcode only after attempting to locate and decode the first priority barcode. The second priority barcode may be harder to locate and decode than the first priority barcode.

The reader 112 may determine 606 whether to attempt to locate and decode the second priority barcode based at least in part on the results of attempting to locate (or locate and decode) the first priority barcode. The results of attempting to locate (or locate and decode) the first priority barcode may include information learned from attempting to locate and decode the first priority barcode and from analyzing the image.

The results of attempting to locate and decode the first priority barcode may include that the reader 112 located and decoded the first priority barcode or that the reader 112 did not locate and decode the first priority barcode.

The results of attempting to locate and decode the first priority barcode may include a first location of the first priority barcode. The first location of the first priority barcode may be a location within the image. The first location of the first priority barcode may also indicate whether the first priority barcode is located in a first region of interest. The first location of the first priority barcode may help the reader 112 determine whether the second priority barcode is likely to be included in the image.

The results of attempting to locate and decode the first priority barcode may include information about a first level of blurriness of the first priority barcode. The first level of blurriness of the first priority barcode may help the reader 112 determine whether the second priority barcode is likely to be less than a second maximum level of blurriness. The first level of blurriness of the first priority barcode may help the reader 112 determine whether the reader 112 is likely to be able to locate and decode the second priority barcode.

The results of attempting to locate and decode the first priority barcode may include a first orientation of the first priority barcode. The first orientation of the first priority barcode may, in connection with the location of the first priority barcode and a first size of the first priority barcode, help the reader 112 determine whether the image is likely to include the second priority barcode. For example, the reader 112 may determine, based on the first orientation, the first location, and the first size, that the second priority barcode must be located a particular direction and distance away from the first priority barcode. The reader 112 may determine that the particular direction and distance away from the first priority barcode is a location not within the image. Therefore, the reader 112 may determine, without searching the entire image, that the second priority barcode is not located in the image.

The results of attempting to locate and decode the first priority barcode may include a first size of the first priority barcode. The first size of the first priority barcode may help the reader 112 determine whether the reader 112 is too close to or too far away from the object. The first size of the first priority barcode may help the reader 112 determine whether the second priority barcode is likely to be greater than or equal to a second minimum size. The first size of the first priority barcode may help the reader 112 determine whether the reader 112 is likely to be able to locate and decode the second priority barcode. For example, assume that if the second priority barcode is smaller than the second minimum size, the reader 112 is unlikely to be able to locate and decode the second priority barcode. Assume that the first size of the first priority barcode in an image indicates that the second priority barcode will be smaller than the second minimum size. This situation may result, for example, from the reader 112 being held too far away from the object. In that situation, the reader 112 may determine to not attempt to locate and decode the second priority barcode.

The results of attempting to locate and decode the first priority barcode may include a first time required to locate and decode the first priority barcode. The first time required to locate and decode the first priority barcode may help the reader 112 determine whether the reader 112 is likely to locate and decode the second priority barcode within a second maximum amount of time.

The reader 112 may determine to not attempt to locate and decode the second priority barcode when the results of attempting to locate and decode the first priority barcode indicate that the reader 112 did not locate or decode the first priority barcode. The reader 112 may determine not to attempt to locate and decode the second priority barcode when the results of attempting to locate and decode the first priority barcode indicate any of the following: the reader 112 will not successfully locate and decode the second priority barcode; the reader 112 is unlikely to successfully locate and decode the second priority barcode; the reader 112 is not sufficiently likely to successfully locate and decode the second priority barcode; or the reader 112 will or will likely take more than a maximum amount of time to locate and decode the second priority barcode. The reader 112 may determine to not attempt to locate and decode the second priority barcode in all circumstances when the reader does not determine to attempt to locate and decode the second priority barcode.

The reader 112 may determine to attempt to locate and decode the second priority barcode in all circumstances when the reader 112 does not determine to not attempt to locate and decode the second priority barcode. The reader 112 may determine to attempt to locate and decode the second priority barcode when the results of attempting to locate and decode the first priority barcode indicate that the reader 112 located and decoded the first priority barcode and that locating and decoding the second priority barcode will be or is sufficiently likely to be successful. The results of attempting to locate and decode the first priority barcode may indicate that locating and decoding the second priority barcode will be or is sufficiently likely to be successful when the results indicate that the second priority barcode will be or is sufficiently likely to be contained in the image, the second priority barcode will be or is sufficiently likely to be as large as or larger than a second minimum size, and/or the second priority barcode will be or is sufficiently likely to be less blurry than a second maximum level blurriness.

To determine 606 whether to attempt to locate and decode the second priority barcode the reader 112 may determine a likelihood that the reader 112 will successfully locate and decode the second priority barcode. The likelihood that the reader 112 will successfully locate and decode the second priority barcode may be based at least in part on a likelihood that the second priority barcode will be located in the image, a likelihood that the second priority barcode will be larger than or equal to a minimum size, and/or a likelihood that the second priority barcode will be less than a maximum level blurriness. The reader 112 may determine whether the likelihood is above or equal to a threshold likelihood. If the reader 112 determines that the likelihood is not above a threshold likelihood, the reader 112 may determine to not attempt to locate and decode the second priority barcode. If the reader 112 determines that the likelihood is above or equal to a threshold level, the reader 112 may determine to attempt to locate and decode the second priority barcode.

If the reader 112 determines to not attempt to locate and decode the second priority barcode, the reader 112 may discard 608 the image without attempting to locate the second priority barcode.

If the reader 112 determines to attempt to locate and decode the second priority barcode, the reader 112 may attempt 610 to locate and decode the second priority barcode. The reader 112 may attempt 610 to locate and decode the second priority barcode for a maximum period of time. The reader 112 may attempt 610 to locate (or locate and decode) the second priority barcode using second priority information, such as the second priority information 302b. The second priority information may include information regarding a second region of interest, a second symbology, a second polarity, a second size, a second finder pattern, or a second orientation. Attempting 610 to locate the second priority barcode may include attempting to locate a barcode in an image that is consistent with the second priority information.

The second priority information may be different from the first priority information. For example, one or more of the second region of interest, the second symbology, the second polarity, the second size, the second finder pattern, or the second orientation may be different from one or more of the first region of interest, the first symbology, the first polarity, the first size, the first finder pattern, or the first orientation.

One or more differences between the first priority information and the second priority information may make it easier to locate and decode the first priority barcode as compared to the second priority barcode. One or more differences between the first priority information and the second priority information may make it such that the reader 112 can locate and decode the first priority barcode faster than the second priority barcode. One or more differences between the first priority information and the second priority information may make it such that the reader 112 can determine whether an image includes the first priority barcode faster than it can determine whether the image includes the second priority barcode. One or more differences between the first priority information and the second priority information may mean that the reader is less likely to fail to locate and decode the first priority barcode when the first priority barcode is present in an image than the reader is to fail to locate and decode the second priority barcode when the second priority barcode is present in an image.

The reader 112 may determine 612 whether the reader 112 successfully located and decoded the second priority barcode. If the reader 112 did not successfully locate and decode the second priority barcode, the reader 112 may discard 614 the image without outputting data. If the reader 112 successfully located and decoded the second priority barcode, the reader 112 may output 616 decoded data. The decoded data may include first decoded data generated from decoding the first priority barcode and second decoded data generated from decoding the second priority barcode. The reader 112 may format or otherwise process the decoded data before outputting the decoded data.

In the alternative to outputting the decoded data, the reader 112 may determine whether to attempt to locate and decode one or more additional barcodes based on the results of attempting to locate (or locate and decode) the second priority barcode.

Figure 7:
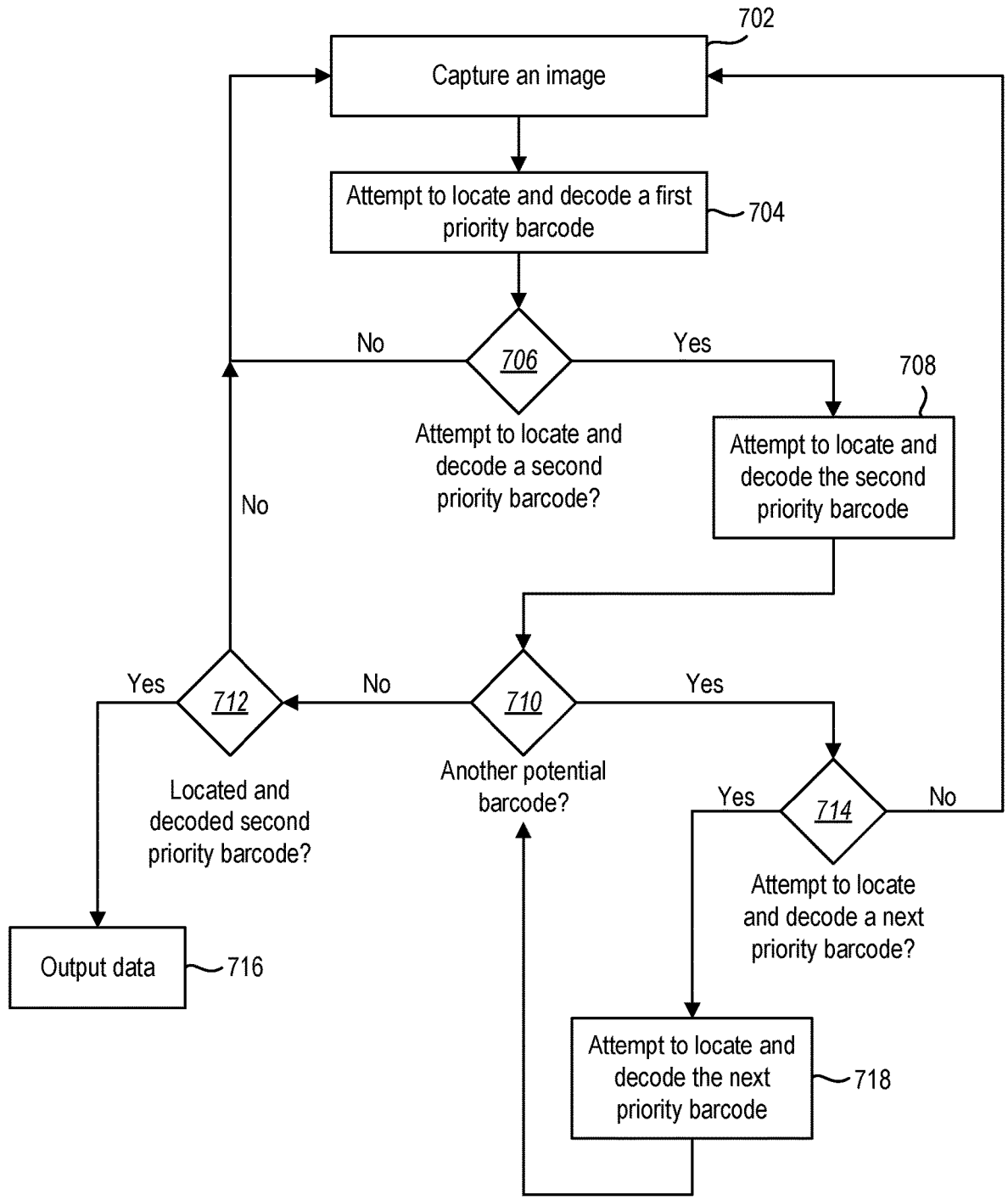
FIG. 7 illustrates an example method for reading barcodes on objects that may include more than two barcodes.

FIG. 7 illustrates one potential method 700 for applying the disclosed systems and methods to situations where there may be more than two barcodes on an object.

A reader may capture 702 an image. The reader may attempt 704 to locate and decode a first priority barcode. The reader may determine 706 whether to attempt to locate and decode a second priority barcode. The determination may be based on the results of attempting to locate and decode the first priority barcode.

If the reader determines to not attempt to locate and decode the second priority barcode, the reader may capture a new image. The reader may proceed to capture the new image without outputting any data associated with the first priority barcode.

If the reader determines to attempt to locate and decode the second priority barcode, the reader may attempt 708 to locate and decode the second priority barcode.

The reader may determine 710 whether the object has another barcode positioned on the object. The number of barcodes positioned on the object may be stored in a storage device on the reader.

If the reader determines that the object does not have another barcode positioned on the object, the reader may determine 712 whether the reader located and decoded the second priority barcode. If the reader determines that the reader located and decoded the second priority barcode, the reader may output 716 data. If the reader determines that the reader did not locate and decode the second priority barcode, the reader may capture a new image.

If the reader determines that the object does have another barcode positioned on the object, the reader may determine 714 whether to attempt to locate and decode a next priority barcode. This determination may be based on the results of attempting to locate and decode the second priority barcode.

If the reader determines to not attempt to locate and decode the next priority barcode, the reader may capture a new image.

If the reader determines to attempt to locate and decode the next priority barcode, the reader may attempt 718 to locate and decode the next priority barcode. The reader may then determine 710 whether the object has another barcode positioned on the object. The method 700 may continue until the reader locates and decodes all the barcodes positioned on the object.

Figure 8:
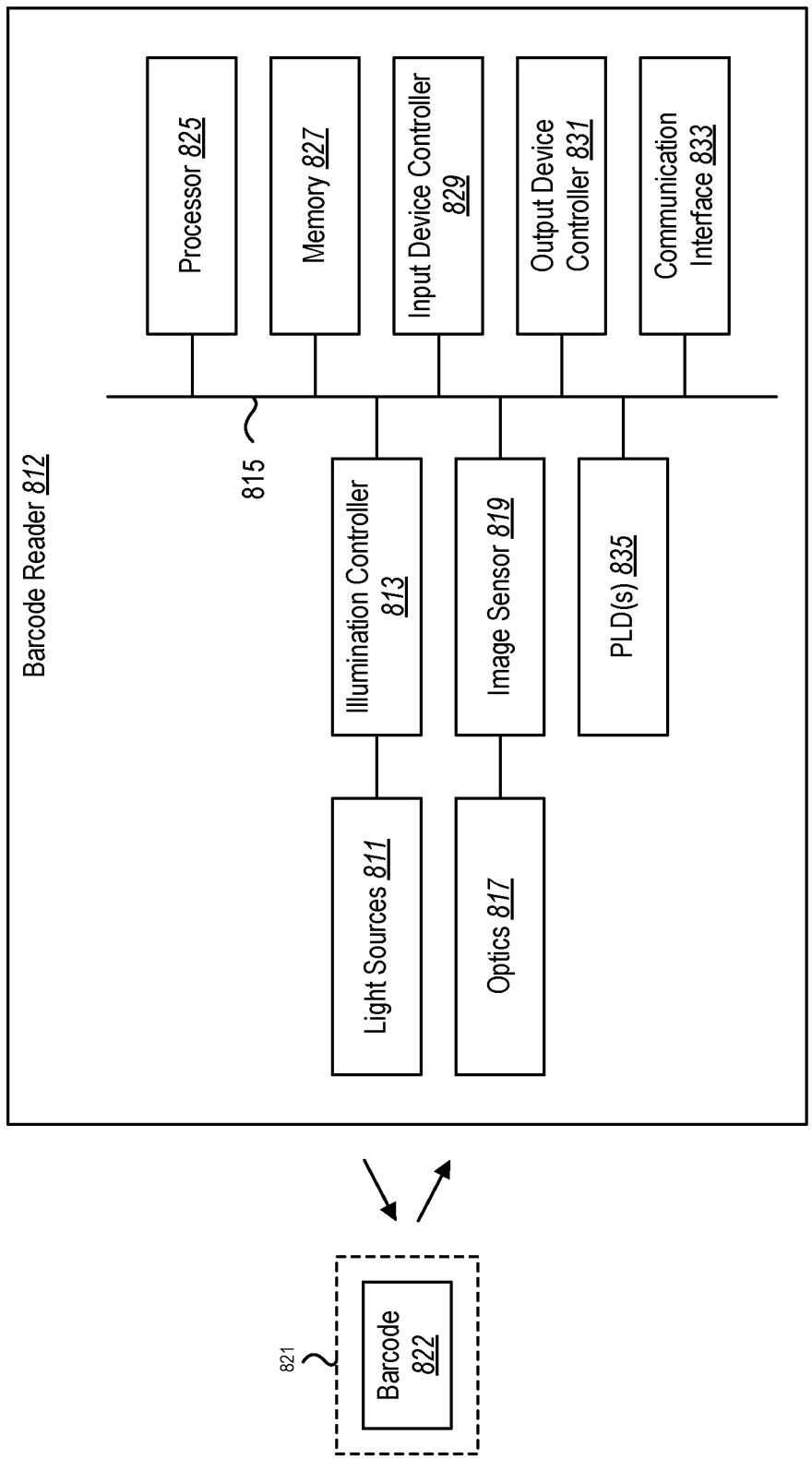
FIG. 8 illustrates various components that may be included in a barcode reader.

FIG. 8 illustrates various components that may be included in a barcode reader 812. It will be understood that FIG. 8 illustrates one example of components that may be included in a barcode reader 812. In one or more embodiments, the barcode reader 812 may include features and functionality described in U.S. application Ser. No. 15/676, 397, titled BARCODE READER CONFIGURED FOR IMAGE PRE-PROCESSING, filed on Aug. 14, 2017, and which is incorporated herein by reference in its entirety.

The barcode reader 812 is shown with a plurality of light sources 811 that may be activated to illuminate a barcode 822. The light sources 811 may be controlled by an illumination controller 813, which may be in electronic communication with other components in the barcode reader 812 via a system bus 815.

The barcode reader 812 may also include optics 817 and an image sensor 819. The image sensor 819 may include a plurality of light-sensitive elements, or pixels. The optics 817 may focus light reflected from a target area 821 (i.e., the area that is illuminated by the light sources 811) onto the image sensor 819. A housing (not shown) may be provided for shielding the light-sensitive elements in the image sensor 819 from ambient light. The image sensor 819 may be in electronic communication with other components in the barcode reader 812 via the system bus 815.

The barcode reader 812 is also shown with a processor 825 and memory 827. The processor 825 may control various aspects of the operation of the barcode reader 812 and may be embodied as a microprocessor, a microcontroller, a digital signal processor (DSP), etc. The processor 825 may perform logical and arithmetic operations based on program instructions stored within the memory 827.

As used herein, the term "memory" may be broadly defined as any electronic component capable of storing electronic information, and may be embodied as read only memory (ROM), random access memory (RAM), magnetic disk storage media, optical storage media, flash memory devices in RAM, on-board memory included with the processor 825, erasable programmable read-only memory (EPROM), electrically erasable programmable read-only memory (EEPROM), registers, etc. The memory 827 may store program instructions and other types of data. The program instructions may be executed by the processor 825 to implement some or all of the methods disclosed herein. The processor 825 and memory 827 may be in electronic communication with other components in the barcode reader 812 via the system bus 815.

The barcode reader 812 is also shown with an input device controller 829 for controlling input devices, such as keys, buttons, etc. The barcode reader 812 is also shown with an output device controller 831 for controlling output devices, such as a display screen. The input device controller 829 and output device controller 831 may be in electronic communication with other components in the barcode reader 812 via the system bus 815.

The barcode reader 812 is also shown with a communication interface 833 for communicating with other electronic devices. The communication interface 833 may be based on wired communication technology, wireless communication technology, etc. Examples of different types of communication interfaces 833 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interface 833 may be in electronic communication with other components in the barcode reader 812 via the system bus 815.

The barcode reader 812 may also include one or more programmable logic devices (PLDs) 835. The PLDs 835 may be programmed to carry out logic functions that implement, either partially or completely, some or all of the methods disclosed herein. Examples of different types of PLDs 835 that may be used include field-programmable gate arrays (FPGAs), logic-cell arrays (LCAs), programmed arrays of logic (PALs), complex programmable-logic devices (CPLDs), and so forth. The PLDs 835 may be in electronic communication with other components in the barcode reader 812 via the system bus 815. One or more application-specific integrated circuits (ASICs) may be used in place of or in addition to the PLDs 835.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    attempting to locate a first priority barcode within an image;
    determining a position of the first priority barcode within the image; and
    determining whether to attempt to locate a second priority barcode within the image based on results of attempting to locate the first priority barcode within the image, the position of the first priority barcode within the image, and a known distance between the first priority barcode and the second priority barcode.

2. The method of claim 1, further comprising, in response to being unable to locate the first priority barcode within the image, discarding the image without attempting to locate the second priority barcode within the image.

3. The method of claim 1, further comprising, in response to locating the first priority barcode within the image and decoding the first priority barcode, attempting to locate and decode the second priority barcode within the image.

4. The method of claim 1, wherein:
    attempting to locate the first priority barcode within the image comprises attempting to locate the first priority barcode within a first region of the image; and
    attempting to locate the second priority barcode within the image comprises attempting to locate the second priority barcode within a second region of the image.

5. The method of claim 1, wherein:
    the first priority barcode comprises a first polarity; and
    the second priority barcode comprises a second polarity.

6. The method of claim 1, wherein determining whether to attempt to locate the second priority barcode within the image comprises determining whether the first priority barcode and the second priority barcode correspond to priority information associated with respective priority barcodes.

7. The method of claim 6, further comprising:
    if the first priority barcode and the second priority barcode correspond to priority information associated with respective priority barcodes, decoding the first priority barcode and the second priority barcode and providing an output comprising decoded data; and
    if the first priority barcode or the second priority barcode does not correspond to priority information associated with one or more of the respective priority barcodes, aborting any further decoding of the first priority barcode or the second priority barcode and discarding any previously decoded data from the first priority barcode or the second priority barcode.

8. The method of claim 6, wherein the priority information comprises one or more of barcode location information, symbology information, polarity information, and size information for one or both of the first priority barcode and the second priority barcode within the image.

9. The method of claim 6, wherein the priority information is stored on a storage device of a barcode reading device.

10. The method of claim 1, wherein determining whether to attempt to locate the second priority barcode within the image comprises:
    identifying that a threshold period of time has passed without locating the first priority barcode within the image; and
    in response to identifying that the threshold period of time has passed without locating the first priority barcode within the image, determining not to locate the second priority barcode.

11. A barcode reading apparatus comprising:
    at least one processor;
    a non-transitory computer-readable medium in electronic communication with the at least one processor;
    first priority information stored in the non-transitory computer-readable medium, the first priority information comprising at least one of a first barcode symbology or a first barcode polarity;
    second priority information stored in the non-transitory computer-readable medium, the second priority information comprising at least one of a second barcode symbology or a second barcode polarity; and
    instructions in the non-transitory computer-readable medium, the instructions being executable by the at least one processor to cause the barcode reading apparatus to:
        capture an image of an object that includes a plurality of barcodes positioned on the object;
        identify a first barcode in the image that is consistent with the first priority information;
        decode the first barcode;
        subsequent to decoding the first barcode, attempt to identify a second barcode in the image that is consistent with the second priority information; and
        in response to identifying the second barcode in the image and determining that the second barcode is consistent with the second priority information, attempt to decode the second barcode.

12. The barcode reading apparatus of claim 11, wherein:
    the first priority information comprises the first barcode symbology; and
    the second priority information comprises the second barcode symbology.

13. The barcode reading apparatus of claim 11, wherein:
    the first priority information comprises the first barcode polarity; and
    the second priority information comprises the second barcode polarity.

14. The barcode reading apparatus of claim 11, wherein the first barcode is located within a first defined region within the image and the second barcode is located within a second defined region within the image, and wherein the first barcode is decoded prior to decoding the second barcode based on identifying that the first barcode is located within the first defined region and the second barcode is located within the second defined region.

15. A barcode reading apparatus comprising:
    at least one processor; and
    a non-transitory computer-readable medium storing instructions thereon that, when executed by the at least one processor, cause the barcode reading apparatus to:
        obtain an image;
        search the image for a first barcode using a first set of criteria for a first time period, wherein the barcode reading apparatus does not attempt to decode any candidate barcode during the first time period if the candidate barcode is not consistent with the first set of criteria;

if the first barcode is not found using the first set of criteria within the first time period, discard the image without searching in the image for any additional barcodes based on any other criteria; and if the first barcode is found using the first set of criteria within the first time period, decode the first barcode and search for a second barcode in the image using a second set of criteria for a second period of time.

16. The barcode reading apparatus of claim 15, wherein the instructions, when executed by the at least one processor, further cause the barcode reading apparatus to:

if the second barcode is not found using the second set of criteria during the second period of time, discard the image; and if the second barcode is found during the second period of time, decode the second barcode and output decoded data, wherein the decoded data is based on data generated from decoding the first barcode and the second barcode.

17. The barcode reading apparatus of claim 15, wherein the first set of criteria includes one or more of a first region of interest, a first symbology type, a first polarity type, a first orientation, a first finder pattern, or a first minimum size.

18. The barcode reading apparatus of claim 15, wherein the first set of criteria is different from the second set of criteria.

19. The barcode reading apparatus of claim 15, wherein the first barcode has at least one first characteristic that makes the first barcode easier to find than the second barcode.

20. A barcode reading apparatus comprising:
   at least one processor; and
   a non-transitory computer-readable medium storing instructions thereon that, when executed by the at least one processor, cause the barcode reading apparatus to:
   obtain an image;
   search the image for a first priority barcode based on priority information;
   determine, based on results of searching for the first priority barcode, a likelihood that the barcode reading apparatus will successfully locate and decode a second priority barcode in the image; and
   determine whether to attempt to locate the second priority barcode based at least in part on the likelihood that the barcode reading apparatus will successfully locate and decode the second priority barcode in the image.

21. The barcode reading apparatus of claim 20, wherein the instructions, when executed by the at least one processor, further cause the barcode reading apparatus to:
   determine to not attempt to locate the second priority barcode if the results indicate the image does not include the first priority barcode.

22. The barcode reading apparatus of claim 20, wherein the instructions, when executed by the at least one processor, further cause the barcode reading apparatus to:
   determine to not attempt to locate the second priority barcode if the results indicate the image does not include the second priority barcode.

23. The barcode reading apparatus of claim 20, wherein the instructions, when executed by the at least one processor, further cause the barcode reading apparatus to:
   determine to not attempt to locate the second priority barcode if the results indicate the second priority barcode will be less than a minimum size.

24. The barcode reading apparatus of claim 20, wherein the instructions, when executed by the at least one processor, further cause the barcode reading apparatus to:
   determine to not attempt to locate the second priority barcode if the results indicate the second priority barcode will have a blurriness greater than a maximum threshold.

* * * * *